US009277402B2

(12) United States Patent
Husted et al.

(10) Patent No.: US 9,277,402 B2
(45) Date of Patent: Mar. 1, 2016

(54) SYSTEMS AND METHODS FOR SECURE HIGH-SPEED LINK MAINTENANCE VIA NFC

(71) Applicant: QUALCOMM Incorporated, San Diego, CA (US)

(72) Inventors: Paul Husted, San Jose, CA (US); Thomas P. Cargill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 13/786,943

(22) Filed: Mar. 6, 2013

(65) Prior Publication Data

US 2014/0254799 A1 Sep. 11, 2014

(51) Int. Cl.
| | |
|---|---|
| *H04K 1/00* | (2006.01) |
| *H04W 12/04* | (2009.01) |
| *H04L 29/06* | (2006.01) |
| *H04W 76/06* | (2009.01) |
| *H04W 4/00* | (2009.01) |
| *H04W 92/10* | (2009.01) |

(52) U.S. Cl.
CPC .............. *H04W 12/04* (2013.01); *H04L 63/068* (2013.01); *H04L 63/18* (2013.01); *H04W 76/068* (2013.01); *H04W 4/008* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 7,366,901 B2 | 4/2008 | Haparnas et al. | |
| 7,990,998 B2 | 8/2011 | Prakash et al. | |
| 2003/0149874 A1* | 8/2003 | Balfanz et al. | ................ 713/168 |
| 2003/0219129 A1* | 11/2003 | Whelan et al. | ................ 380/270 |
| 2008/0222711 A1 | 9/2008 | Michaelis | |
| 2013/0182845 A1* | 7/2013 | Monica et al. | ................ 380/270 |

FOREIGN PATENT DOCUMENTS

| | | |
|---|---|---|
| EP | 1335563 A2 | 8/2003 |
| EP | 2493233 A1 | 8/2012 |
| WO | 2006054232 A1 | 5/2006 |
| WO | 2006106393 A2 | 10/2006 |
| WO | 2012099541 A1 | 7/2012 |

OTHER PUBLICATIONS

International Search Report and Written Opinion—PCT/US2014/021002—ISA/EPO—Jun. 6, 2014.

* cited by examiner

*Primary Examiner* — Brandon Hoffman
(74) *Attorney, Agent, or Firm* — Muncy, Geissler, Olds & Lowe, P.C.

(57) ABSTRACT

Systems, methods, and devices for communicating with a second apparatus in a wireless communications network are described herein. In some aspects, a first wireless communication unit is configured to communicate with the second apparatus via a first wireless protocol. The first wireless communication unit may transmit a first message to the second apparatus. A second wireless communication unit is configured to communicate with the second apparatus over a communication link via a second wireless protocol. The second wireless communication unit may be further configured to disconnect the communication link if the first wireless communication unit does not receive a second message from the second apparatus within a predetermined amount of time after transmission of the first message.

46 Claims, 8 Drawing Sheets

SYSTEMS AND METHODS FOR SECURE HIGH-SPEED LINK MAINTENANCE VIA NFC

BACKGROUND

1. Field

The present application relates generally to wireless communications, and more specifically to systems, methods, and devices for maintaining a link using near field communications.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Wireless networks may include security protocols to protect data that is transferred wirelessly over the networks. Such security protocols include wired equivalent privacy (WEP), Wi-Fi Protected Access (WPA), Advanced Encryption Standard (AES), a Pairwise Master Key (PMK), and the like. In addition, wired networks may include security protocols to protect data that is transferred, such as hypertext transfer protocol secure (HTTPS), firewalls, and the like. However, these security protocols may be compromised if a person has access to the right tools or equipment. In some situations, a higher level of security may be desired when communicating via wired or wireless networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a system comprising one or more apparatuses that communicate with a second apparatus. The system comprises a first wireless communication unit configured to communicate with the second apparatus via a first wireless protocol. The first wireless communication unit may transmit a first message to the second apparatus. The system further comprises a second wireless communication unit configured to communicate with the second apparatus over a communication link via a second wireless protocol. The second wireless communication unit may be further configured to disconnect the communication link if the first wireless communication unit does not receive a second message from the second apparatus within a predetermined amount of time after transmission of the first message.

Another aspect of this disclosure provides a method of communicating with a second apparatus. The method comprises communicating, by a first wireless communication unit, with the second apparatus via a first wireless protocol. The first wireless communication unit may transmit a first message to the second apparatus. The method further comprises communicating, by a second wireless communication unit, with the second apparatus over a communication link via a second wireless protocol. The method further comprises disconnecting, by the second wireless communication unit, the communication link if the first wireless communication unit does not receive a second message from the second apparatus within a predetermined amount of time after transmission of the first message.

Another aspect of this disclosure provides an apparatus for communicating with a second apparatus. The apparatus comprises first means for communicating with the second apparatus via a first wireless protocol. The first means for communicating may transmit a first message to the second apparatus. The apparatus further comprises second means for communicating with the second apparatus over a communication link via a second wireless protocol. The apparatus further comprises means for disconnecting the communication link if the first means for communicating does not receive a second message from the second apparatus within a predetermined amount of time after transmission of the first message.

Another aspect of this disclosure provides a non-transitory computer-readable medium comprising code that, when executed, causes an apparatus to communicate, using a first wireless communication unit, with a second apparatus via a first wireless protocol. The first wireless communication unit may transmit a first message to the second apparatus. The medium further comprises code that, when executed, causes an apparatus to communicate, using a second wireless communication unit, with the second apparatus over a communication link via a second wireless protocol. The medium further comprises code that, when executed, causes an apparatus to disconnect, using the second wireless communication unit, the communication link if the first wireless communication unit does not receive a second message from the second apparatus within a predetermined amount of time after transmission of the first message.

DETAILED DESCRIPTION

Figure 1:
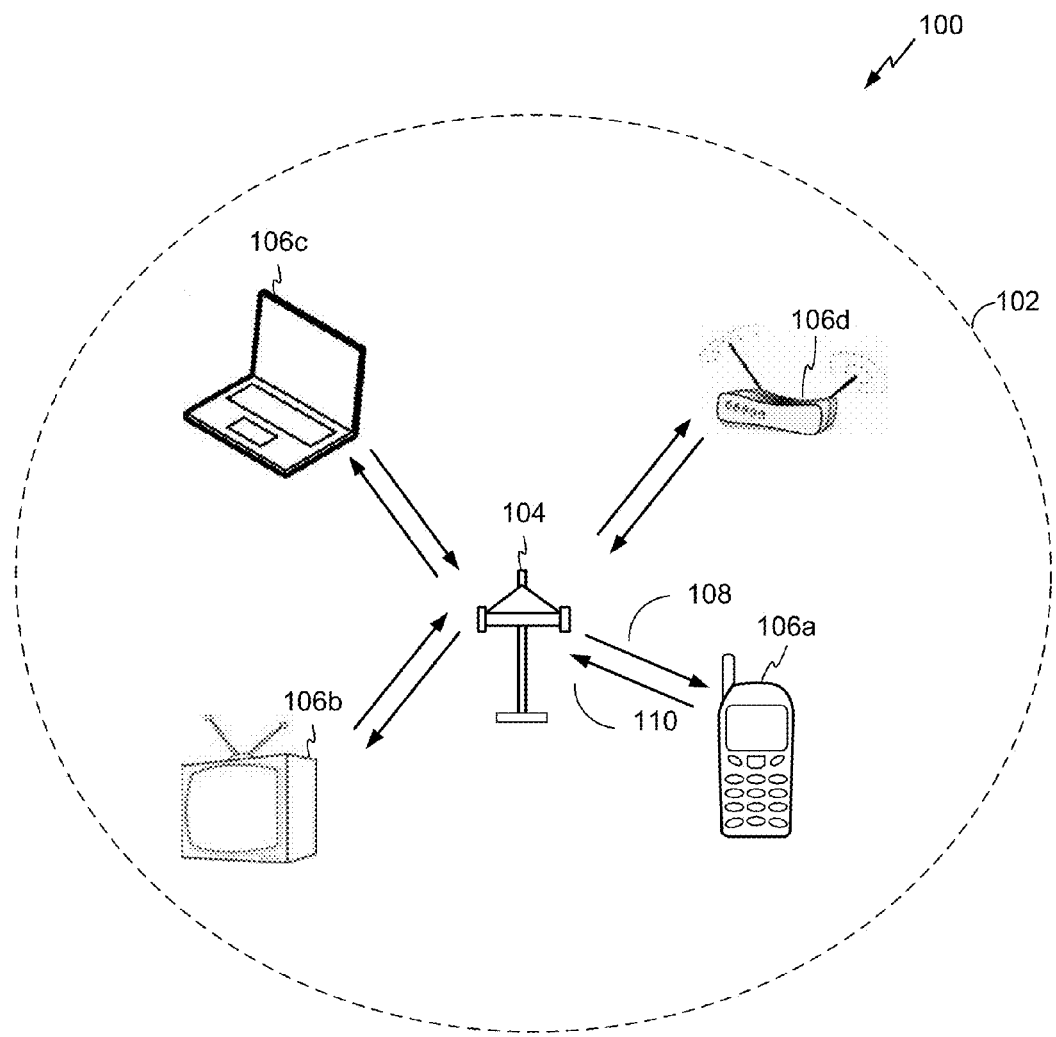
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wired and wireless network technologies may include various types of short-range communications (e.g., near-field communication (NFC), radio-frequency identification (RFID), radio frequency (RF), etc.) and long-range communications. The short-range communications may be characterized by communications between devices that are 0-4 cm apart. Long-range communications may include any local wireless area network (WLAN) protocol (e.g., any IEEE 802.11 protocol, Bluetooth, etc.), any wireless wide area network (WWAN) protocol (e.g., LTE, CDMA, WiMAX, GSM, etc.), any wired network protocol (e.g., IEEE 1394, Ethernet, universal serial bus (USB), etc.), and the like. In particular, a WLAN may be used to interconnect nearby devices together, employing widely used networking protocols. A WWAN may be used to interconnect devices separated by a distance, employing widely used networking protocols. The various aspects described herein may apply to any communication standard, such as a wireless protocol or a wired protocol.

In some aspects, wireless signals may be transmitted according to a short-range communication protocol or a long-range communication protocol using orthogonal frequency-division multiplexing (OFDM), direct-sequence spread spectrum (DSSS) communications, a combination of OFDM and DSSS communications, or other schemes. Wired signals may be transmitted according to a short-range communication protocol or a long-range communication protocol using similar data transmission and/or compression techniques. Implementations of such a protocol may be used for secure communications, mobile banking, mobile telephony, payment transactions, network access, and the like. Advantageously, aspects of certain devices implementing any of the above-mentioned protocols may consume less power than devices implementing other wired or wireless protocols, and/or may be used to transmit wired or wireless signals across a relatively long range, for example about one kilometer or longer.

In some implementations, a short-range communication network and/or a long-range communication network includes various devices which are the components that access the wired or wireless network. For example, there may be two types of devices: access points ("APs") and clients (also referred to as stations, or "STAs"). In general, an AP may serve as a hub or base station for the communication network and an STA serves as a user of the communication network. For example, an STA may be a laptop computer, a personal digital assistant (PDA), a mobile phone, etc. In an example, an STA connects to an AP via a WiFi (e.g., an IEEE 802.11 protocol) compliant wireless link or a mobile carrier compliant wireless link (e.g., LTE, CDMA, WiMAX, GSM, etc.) to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology. An AP may further comprise a femto cell, a cell tower, a wired or wireless gateway, a mobile prepaid card, an RFID reader/writer, a portable electronic device, a computer, a docking station, a charging station, an automated teller machine (ATM), or the like.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the a short-range and/or long-range communication protocol. Such devices, whether used as an STA or AP or other device, may be used for secure communications, mobile banking, mobile telephony, payment transactions, and/or network access. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
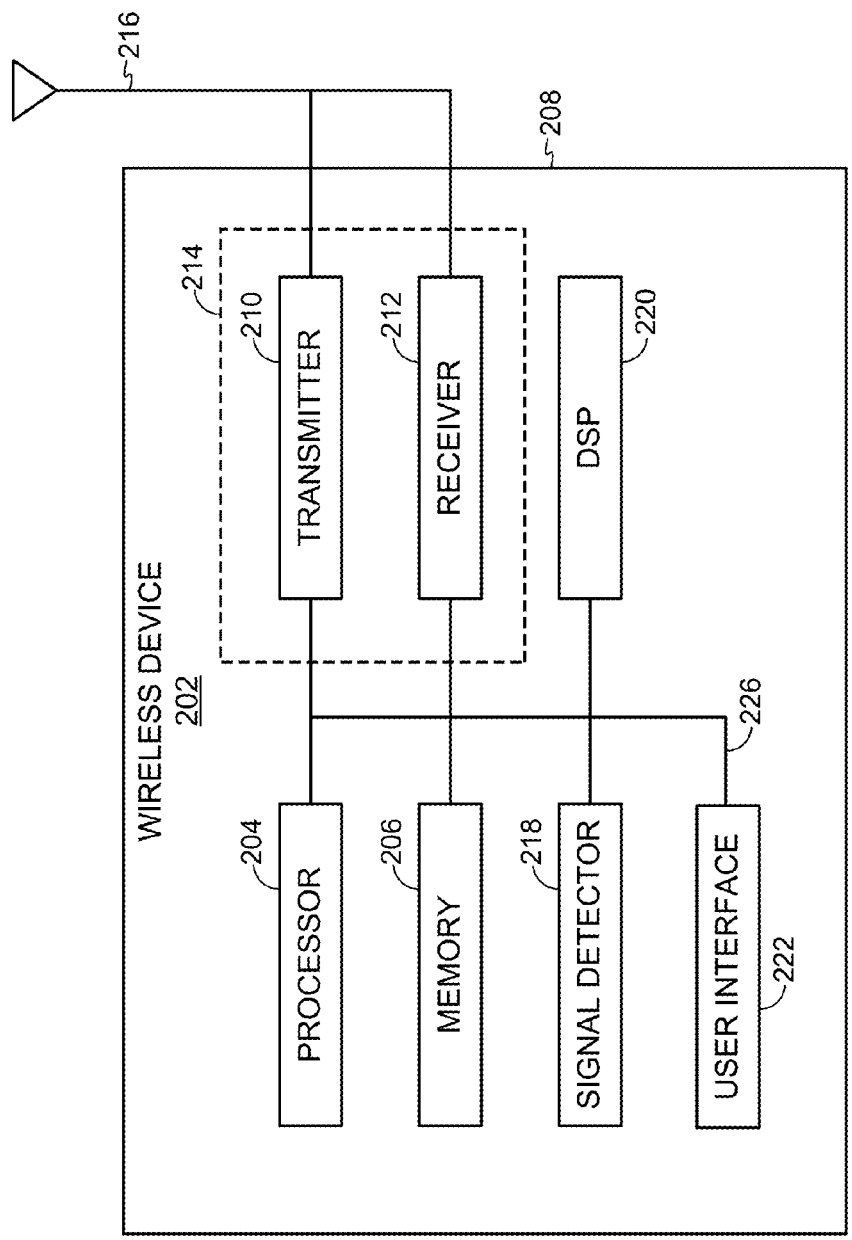
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas. For example, the wireless device 202 may include a transceiver and/or antenna for short-range communications and a transceiver and/or antenna for long-range communications.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106 and may be used to transmit and/or receive communications. That is, either AP 104 or STA 106 may serve as transmitter or receiver devices. Certain aspects contemplate signal detector 218 being used by software running on memory 206 and processor 204 to detect the presence of a transmitter or receiver.

As described above, wireless networks may include security protocols to protect data that is transferred wirelessly over the networks. Such security protocols include wired equivalent privacy (WEP), Wi-Fi Protected Access (WPA), Advanced Encryption Standard (AES), a Pairwise Master Key (PMK), and the like. In addition, wired networks may include security protocols to protect data that is transferred, such as hypertext transfer protocol secure (HTTPS), firewalls, and the like. However, these security protocols may be compromised if a person has access to the right tools or equipment. For example, tools or equipment may be used to determine an encryption key and discreetly decrypt transmitted data.

The possibility that security protocols may be compromised could be especially troublesome for certain applications. For example, if security protocols are compromised while a user is engaged in mobile banking, the user may suffer a financial loss. Thus, in some situations, a higher level of security may be desired when communicating via wired or wireless networks.

In some embodiments, a higher level of network security may be achieved via devices capable of communicating via a short-range communication and a long-range communication. For example, the short-range communication may provide data or otherwise allow a device to communicate via a secure link over the long-range communication. Such embodiments and variations thereof are disclosed in greater detail below with respect to FIGS. 3-8.

Figure 3:
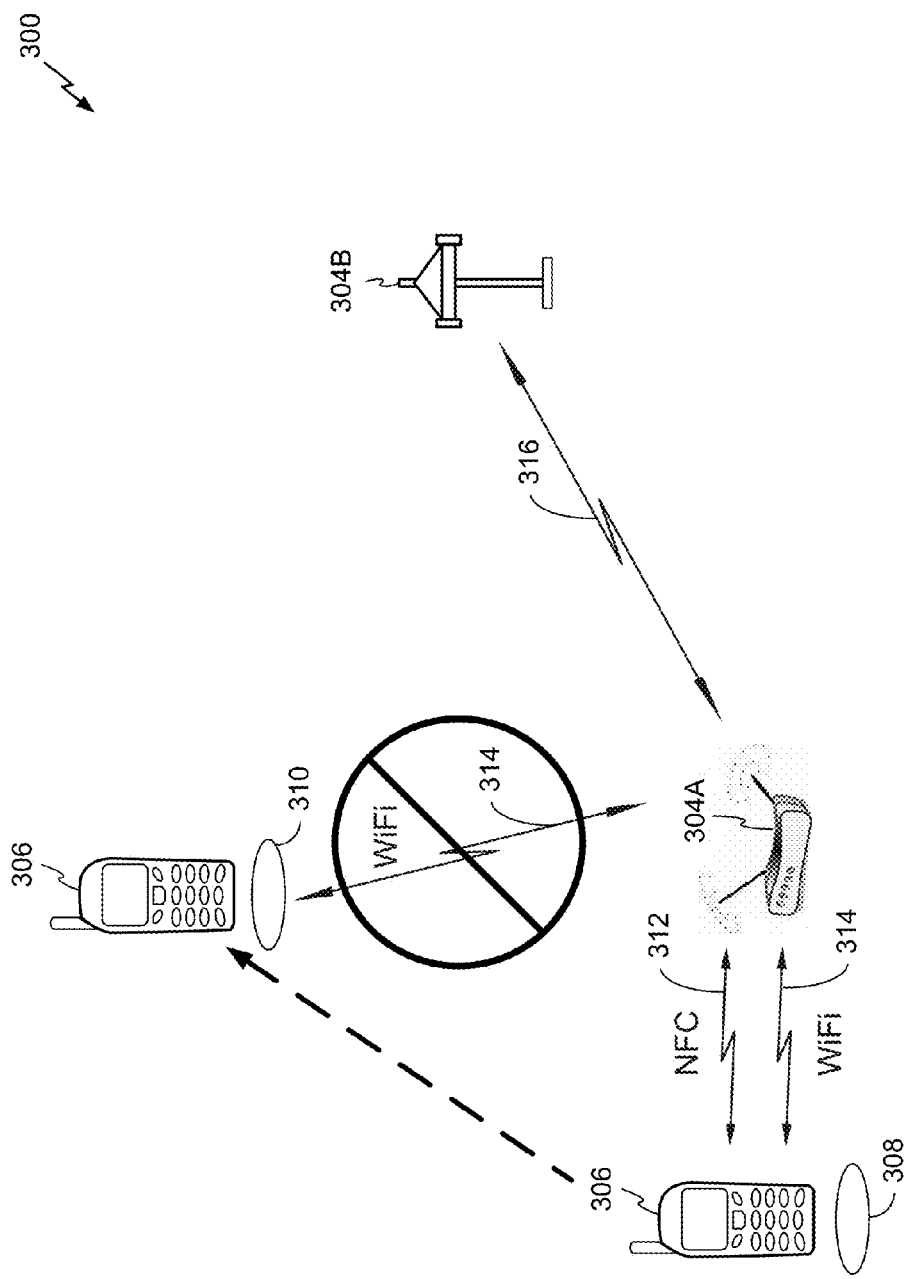
FIG. 3 illustrates a wireless communication system in which a station communicates via a short-range communication protocol and a long-range communication protocol.

FIG. 3 illustrates a wireless communication system 300 in which a STA 306 communicates via a short-range communication protocol and a long-range communication protocol. In an embodiment, the transceiver 214 of the STA 306 may include a short-range communication transceiver configured to communicate with a short-range base station (e.g., AP 304A) via a short-range communication protocol 312 and a long-range communication transceiver configured to communicate with a long-range base station (e.g., AP 304A) via a long-range communication protocol 314. The short-range communication transceiver may be coupled to a processor, such as processor 204, and/or the long-range communication transceiver. For example, the short-range communication transceiver may be hardwired to the processor 204 and/or the long-range communication transceiver.

Figure 4:
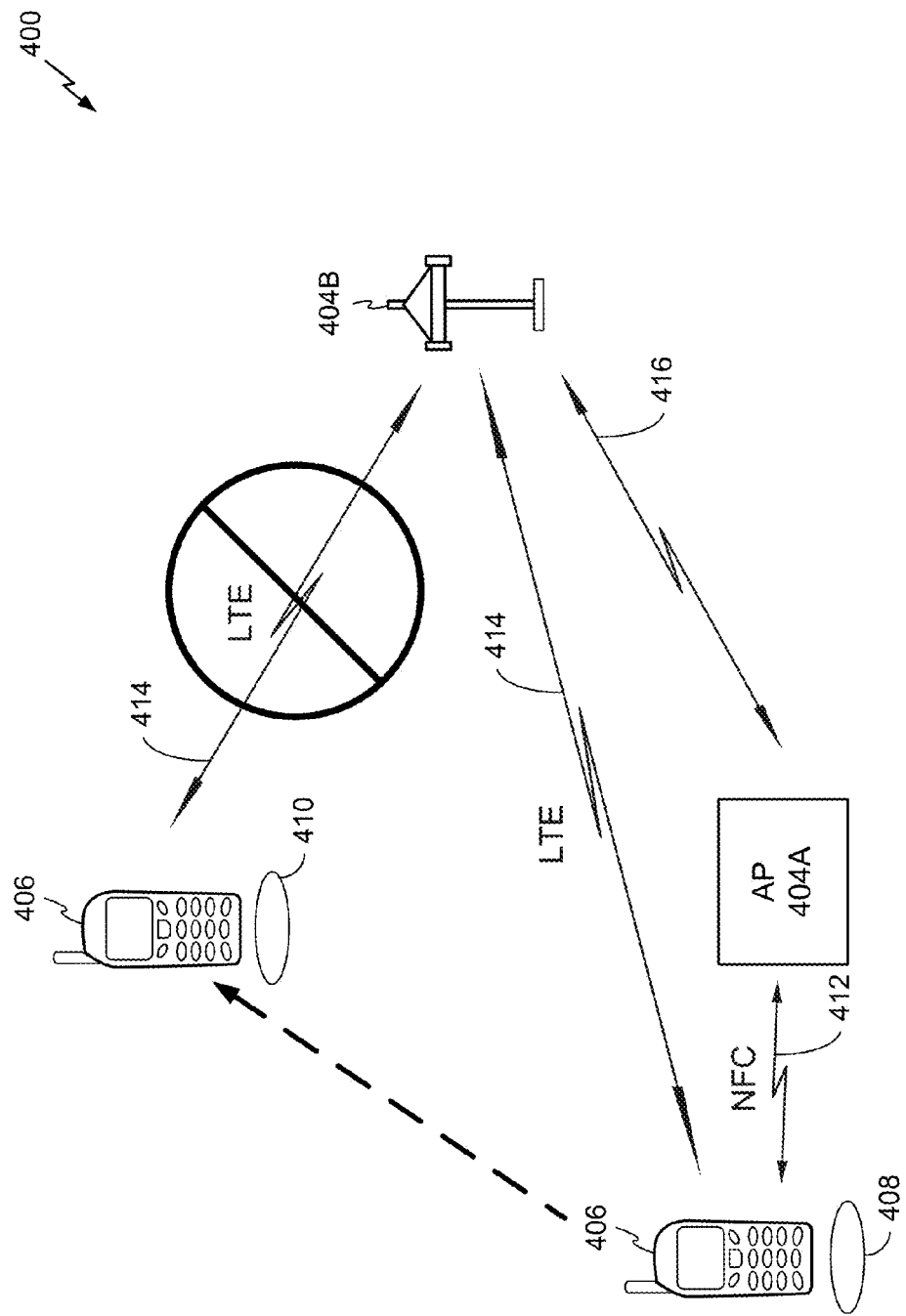
FIG. 4 illustrates another wireless communication system in which a station communicates via a short-range communication protocol and a long-range communication protocol.

Generally, a short-range base station may include an access point, a femto cell, a cell tower, a mobile prepaid card, an RFID reader/writer, a portable electronic device, a computer, a docking station, a charging station, an automated teller machine (ATM), or the like. A long-range base station may include an access point, a femto cell, a cell tower, a wired or wireless gateway, a portable electronic device, a computer, an ATM, or the like. As illustrated in FIG. 3, the short-range base station and the long-range base station are the same device, AP 304A. Thus, the AP 304A may perform the functions of the short-range base station and the long-range base station. In other embodiments, as illustrated in FIG. 4 below, the short-range base station and the long-range base station are separate devices.

As illustrated in FIG. 3, the short-range communication protocol 312 may be an NFC protocol and the long-range communication protocol 314 may be a WiFi protocol (e.g., an IEEE 802.11 protocol). While specific communication protocols are provided in FIG. 3, this is merely illustrative as one skilled in the art will recognize that the disclosure provided herein applies to any communication protocol.

In some embodiments, the AP 304A may relay communications between the STA 306 and another AP 304B. The communications may be relayed over communication link 316. Such communications may be relayed using any wired or wireless communication protocol.

In an embodiment, the STA 306 may authenticate with a long-range communication network via the rules determined by the long-range communication protocol 314 to establish a communication link between the STA 306 and the AP 304A in its capacity as a long-range base station. For example, the STA 306 may perform handshaking with the long-range communication network via the AP 304A, including providing the appropriate security information (e.g., a passphrase, a key, a token, etc.), to gain access to the long-range communication network. The STA 306 may perform this authentication while located at position 308.

In another embodiment, the STA 306 may authenticate with a long-range communication network via the short-range communication protocol 312 to establish a communication link between the STA 306 and the AP 304A in its capacity as a long-range base station. For example, the STA 306 may be configured to receive data from the AP 304A in its capacity as a short-range base station via the short-range communication protocol 312. The data may include a code (e.g., a passphrase, a key, a token, etc.) recognized by devices, such as the AP 304A, that communicate via the long-range communication protocol 314. The code may provide access to the long-range communication network. As an example, the data may include a security key that provides access to a WiFi network. The STA 306 may then request, from the AP 304A in its capacity as the long-range base station, access to the long-range communication network using the code received via the short-range communication protocol 312.

The short-range communication protocol 312 may be further used to maintain or modify the communication link between the STA 306 and the AP 304A over the long-range communication protocol 314. For example, the AP 304A in its capacity as the short-range base station may periodically transmit a message to the STA 306. In an embodiment, each message may include a new code. The long-range communication network may request or otherwise expect the STA 306 to transmit the new code (or a derivative of the new code) via the long-range communication protocol 314 in order to maintain the communication link. The long-range communication network may also expect the STA 306 to use the new code (or a derivative of the new code) to modify the security (or encryption) parameters of the communication link in order to maintain the communication link. If the STA 306 receives the new code via the short-range communication protocol 312 and transmits the new code (or a derivative of the new code) back to the AP 304A in its capacity as the long-range base station or another device in the long-range communication network (or if the STA 306 uses the new code or a derivative of the new code to modify the security or encryption parameters of the communication link), then the communication link may be maintained. If the STA 306 does not receive the new code via the short-range communication protocol 312 and/or does not transmit the new code (or a derivative of the new code) back to the AP 304A in its capacity as the long-range base station or another device in the long-range communication network, then the communication link may be terminated.

The STA 306 may periodically transmit a message to the AP 304A in its capacity as the short-range base station. In an embodiment, the message may include an indication that the STA 306 is still present and within range of the AP 304A. In another embodiment, the message may include payment information used to maintain the communication link. If the AP 304A in its capacity as the short-range base station receives the message or periodically receives messages during a requested interval, then the communication link may be maintained. If the AP 304A in its capacity as the short-range base station does not receive the message or does not periodically receive messages during a requested interval, then the communication link may be terminated.

In another embodiment, the message may include a request to acknowledge receipt. If the STA 306 transmits an acknowledgement message to the AP 304A in its capacity as the short-range base station that acknowledges receipt of the message transmitted by the AP 304A in its capacity as the short-range base station, then the AP 304A may maintain the communication link or provide information to the STA 306 (e.g., a code) that would allow the STA 306 to maintain the communication link. If the STA 306 does not acknowledge receipt of the message transmitted by the AP 304A in its capacity as the short-range base station, then the AP 304A may disconnect the communication link or not provide information to the STA 306 that would allow the device to maintain the communication link.

The STA 306 may not receive the new code and/or may not acknowledge receipt of the message from the AP 304A in its capacity as the short-range base station if the STA 306A is moved to a different location. In an embodiment, the STA 306 is configured to communicate with the AP 304A via the short-range communication protocol 312 when located near or at position 308. The position 308 may be within a certain distance of the AP 304A (e.g., 1 cm). However, the AP 304A in its capacity as the short-range base station and/or the short-range communication transceiver of the AP 304A may only be configured to transmit messages for a short distance (e.g., 0-4 cms). If the STA 306 is moved from the position 308 to another location, such as position 310, then the STA 306 may no longer be able to communicate with the AP 304A via the short-range communication protocol 312. Thus, the STA 306 would not receive the new code and/or would not acknowledge receipt of the message from the AP 304A in its capacity as the short-range base station. As illustrated in FIG. 3, the communication link via the long-range communication protocol 314 may then be terminated after waiting a predetermined period of time for the STA 306 to respond.

In an embodiment, the AP 304A may also verify the identity of the STA 306. For example, the STA 306 may transmit identifying data to the AP 304A in its capacity as the long-range base station in addition to a code in order to authenticate and/or maintain a communication link via the long-range communication protocol 314. Thus, if the STA 306 is moved away from the position 308 or any other location close to the AP 304A and another STA takes the place of STA 306, the AP 304A may be configured to disconnect the communication link even though a new code may be transmitted and/or receipt of the message transmitted by the AP 304A in its capacity as the short-range base station may be acknowledged by the other STA.

FIG. 4 illustrates another wireless communication system 400 in which a STA 406 communicates via a short-range communication protocol and a long-range communication protocol. In an embodiment, the transceiver 214 of the STA 406 may include a short-range communication transceiver configured to communicate with a short-range base station (e.g., AP 404A) via a short-range communication protocol 412 and a long-range communication transceiver configured to communicate with a long-range base station (e.g., AP 404B) via a long-range communication protocol 414. The short-range communication transceiver may be coupled to a processor, such as processor 204, and/or the long-range communication transceiver. For example, the short-range communication transceiver may be hardwired to the processor 204 and/or the long-range communication transceiver.

As illustrated in FIG. 4, the short-range base station and the long-range base station are separate devices, AP 404A and AP 404B. The short-range communication protocol 412 may be an NFC protocol and the long-range communication protocol 414 may be LTE. While specific communication protocols are provided in FIG. 4, this is merely illustrative as one skilled in the art will recognize that the disclosure provided herein applies to any communication protocol.

In an embodiment, the STA 406 may authenticate with a long-range communication network via the rules determined by the long-range communication protocol 414 to establish a communication link between the STA 406 and the AP 404B. For example, the STA 406 may perform handshaking with the long-range communication network via the AP 404B, including providing the appropriate security information (e.g., a passphrase, a key, a token, etc.), to gain access to the long-range communication network. The STA 406 may perform this authentication while located at position 408.

In another embodiment, the STA 406 may authenticate with a long-range communication network via the short-range communication protocol 412 to establish a communication link between the STA 406 and the AP 404B. For example, the STA 406 may be configured to receive data from the AP 404A via the short-range communication protocol 412. The data may include a code (e.g., a passphrase, a key, a token, etc.) recognized by devices, such as the AP 404B, that communicate via the long-range communication protocol 414. The code may provide access to the long-range communication network. As an example, the data may include a security key that provides access to an LTE network. The STA 406 may then request, from the AP 404B, access to the long-range communication network using the code received via the short-range communication protocol 412.

As described above, the short-range communication protocol 412 may be further used to maintain of modify the communication link between the STA 406 and the AP 404B over the long-range communication protocol 414. For example, the AP 404A may periodically transmit a message to the STA 406. In an embodiment, each message may include a new code. The long-range communication network may request or otherwise expect the STA 406 to transmit the new code (or a derivative of the new code) via the long-range communication protocol 414 in order to maintain the communication link. The long-range communication network may also expect the STA 306 to use the new code (or a derivative of the new code) to modify the security (or encryption) parameters of the communication link in order to maintain the communication link. If the STA 406 receives the new code via the short-range communication protocol 412 and transmits the new code (or a derivative of the new code) to the AP 404B or another device in the long-range communication network (or if the STA 306 uses the new code or a derivative of the new code to modify the security or encryption parameters of the communication link), then the communication link may be maintained. If the STA 406 does not receive the new code via the short-range communication protocol 412 and/or does not transmit the new code (or a derivative of the new code) to the AP 404B or another device in the long-range communication network, then the communication link may be terminated.

The STA 406 may periodically transmit a message to the AP 404A. In an embodiment, the message may include an indication that the STA 406 is still present and within range of the AP 404A. In another embodiment, the message may include payment information used to maintain the communication link. If the AP 404A receives the message or periodically receives messages during a requested interval, then the communication link may be maintained. If the AP 404A does not receive the message or does not periodically receive messages during a requested interval, then the communication link may be terminated.

In another embodiment, the message may include a request to acknowledge receipt. If the STA 406 transmits an acknowledgement message to the AP 404A that acknowledges receipt of the message transmitted by the AP 404A, then the AP 404A may inform the AP 404B via link 416 to maintain the communication link or provide information to the STA 406 (e.g., a code) that would allow the STA 406 to maintain the communication link. If the STA 406 does not acknowledge receipt of the message transmitted by the AP 404A, then the AP 404A may inform the AP 404B via link 416 to disconnect the communication link or not provide information to the STA 406 that would allow the STA 406 to maintain the communication link.

The STA 406 may not receive the new code and/or may not acknowledge receipt of the message from the AP 404A if the STA 406 is moved from the position 408 to a different location, such as position 410. In an embodiment, the STA 406 is configured to communicate with the AP 404A when located near or at position 408. The position 408 may be within a certain distance of the AP 404A (e.g., 1 cm). However, the AP 404A and/or the short-range communication transceiver of the AP 404A may only be configured to transmit messages for a short distance (e.g., 0-4 cms). If the STA 406 is moved from the position 408 to another location, such as position 410, then the STA 406 may no longer be able to communicate with the AP 404A. Thus, the AP 406 would not receive the new code and/or would not acknowledge receipt of the message from the AP 404A. As illustrated in FIG. 4, the communication link via the long-range communication protocol 414 may then be terminated after waiting a predetermined period of time for the STA 406 to respond.

In an embodiment, the AP 404A and/or the AP 404B may also verify the identity of the STA 406. For example, the STA 406 may transmit identifying data to the AP 404B in addition to a code in order to authenticate and/or maintain a communication link via the long-range communication protocol 414. Thus, if the STA 406 is moved away from the position 408 or any location close to the AP 404A and another STA takes the place of STA 406, then the AP 404B may be configured to disconnect the communication link even though a new code may be transmitted and/or receipt of the message transmitted by the AP 404A may be acknowledged by the other STA.

Example Use Case

The STAs 306 and/or 406 and APs 304A, 404A, and/or 404B described herein may be implemented in a variety of applications. In an embodiment, a STA may be a mobile phone and the short-range and long-range base stations may be an ATM. The mobile phone may be configured to communicate with the ATM via NFC and WiFi. For example, when the mobile phone is placed near or on the ATM, the mobile phone may receive a code via NFC. The mobile phone may use the code to connect to the WiFi network operated by the ATM. Once connected to the ATM WiFi network, a user may be able to conduct secure transactions with the ATM via the mobile phone (e.g., the mobile phone may include an application that the user interacts with). As soon as the mobile phone is moved a certain distance away from the ATM (e.g., from position 308 to position 310), the ATM may disconnect the communication link between the mobile phone and the ATM over the WiFi network (e.g., the application may be disabled).

In another example, the STA may be a mobile phone, the short-range base station may be an NFC hub (e.g., a port or device that is configured to communicate via NFC), and the long-range base station may be a WiFi AP. The mobile phone may be configured to communicate with the NFC hub via NFC and with the WiFi AP via WiFi. For example, when the mobile phone is placed near or on the NFC hub, the mobile phone may transmit payment information to the NFC hub. The payment information may include data that allows the NFC hub to charge the user of the mobile phone a fee. The mobile phone may periodically transmit this payment information every few seconds. In response to receiving the payment information, the NFC hub may provide a code to the mobile phone that allows the mobile phone to connect to the WiFi network. The code may be transmitted once or a new code may be transmitted each time payment information is received. Alternatively, in response to receiving the payment information, the NFC hub may inform the WiFi AP that the mobile phone has supplied payment information. The WiFi AP may then allow the mobile phone to connect to its WiFi network as long as payment information is transmitted to the NFC hub (e.g., as long as the mobile phone is not moved away from the NFC hub).

Flowcharts and Diagrams

Figure 5:
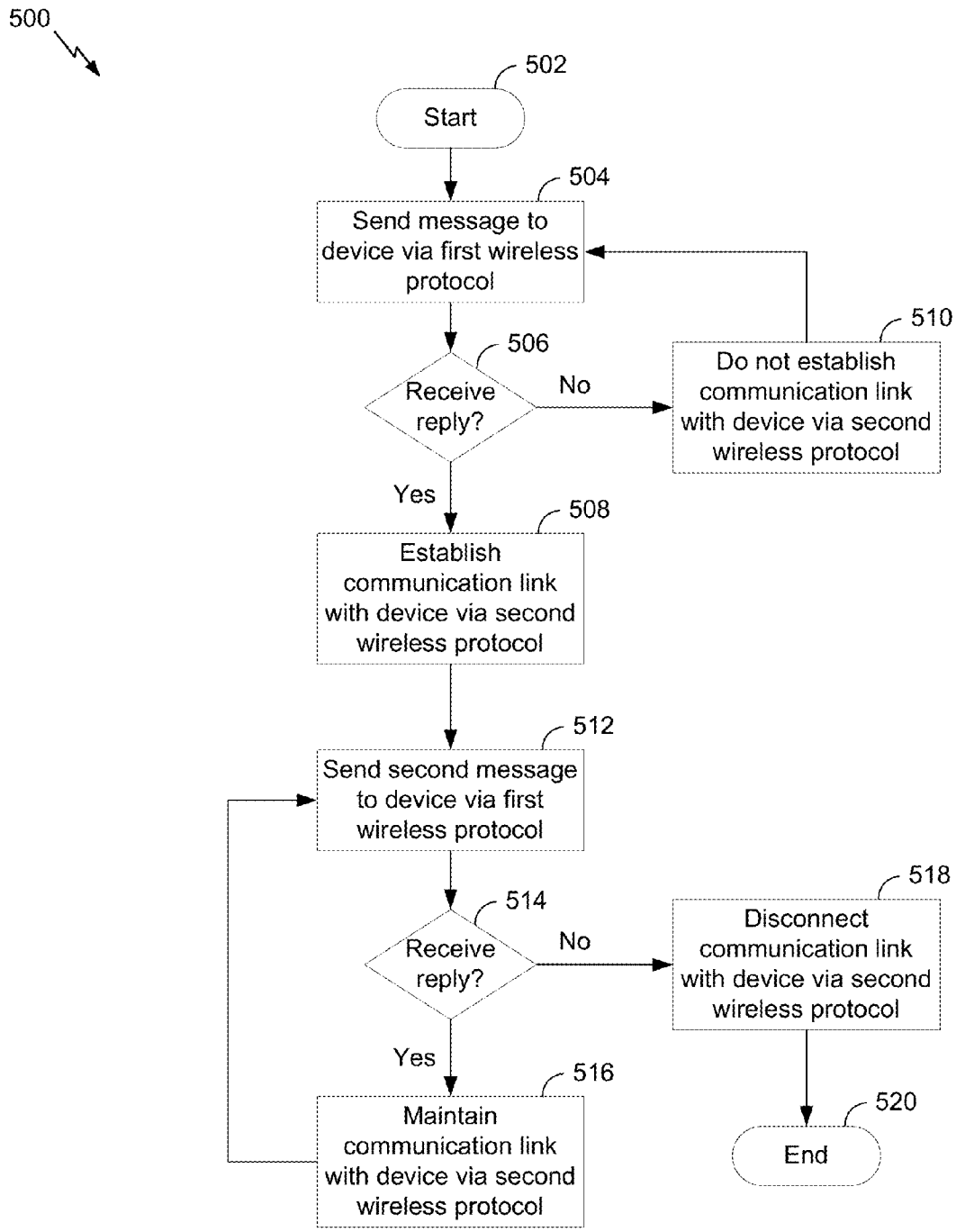
FIG. 5 illustrates a decision diagram for maintaining a secure connection between a station and an access point.

FIG. 5 illustrates a decision diagram 500 for maintaining a secure connection between a STA and an AP. In an embodiment, the decision diagram 500 may be executed by a processor, such as the processor 204, of a short-range base station (e.g., the APs 304A and/or 404A). As illustrated in FIG. 5, the process for maintaining a secure connection starts at block 502.

At block 504, a message is sent to a device, such as the STA 306 or 406, via a first wireless protocol. In an embodiment, the first wireless protocol is a short-range communication protocol. At block 506, the short-range base station determines whether a reply to the message was received. If a reply is received, the diagram 500 proceeds to block 508. If a reply is not received, the diagram 500 proceeds to block 510.

At block 508, a communication link is established between the device and a long-range base station via a second wireless protocol. In an embodiment, the second wireless protocol is a long-range communication protocol. At block 510, a communication link is not established between the device and the long-range base station via the second wireless protocol. After block 510, the diagram 500 proceeds back to block 504.

At block 512, a second message is sent to the device via the first wireless protocol. At block 514, the short-range base station determines whether a reply to the second message was received. If a reply is received, the diagram 500 proceeds to block 516. If a reply is not received, the diagram 500 proceeds to block 518.

At block 516, the communication link via the second wireless protocol between the device and the long-range base station is maintained. After block 516, the diagram 500 proceeds back to block 512.

At block 518, the communication link via the second wireless protocol between the device and the long-range base station is disconnected. In an embodiment, the short-range base station and/or the long-range base station may disconnect the communication link. After block 518, the diagram 500 proceeds to block 520 and ends.

Figure 6:
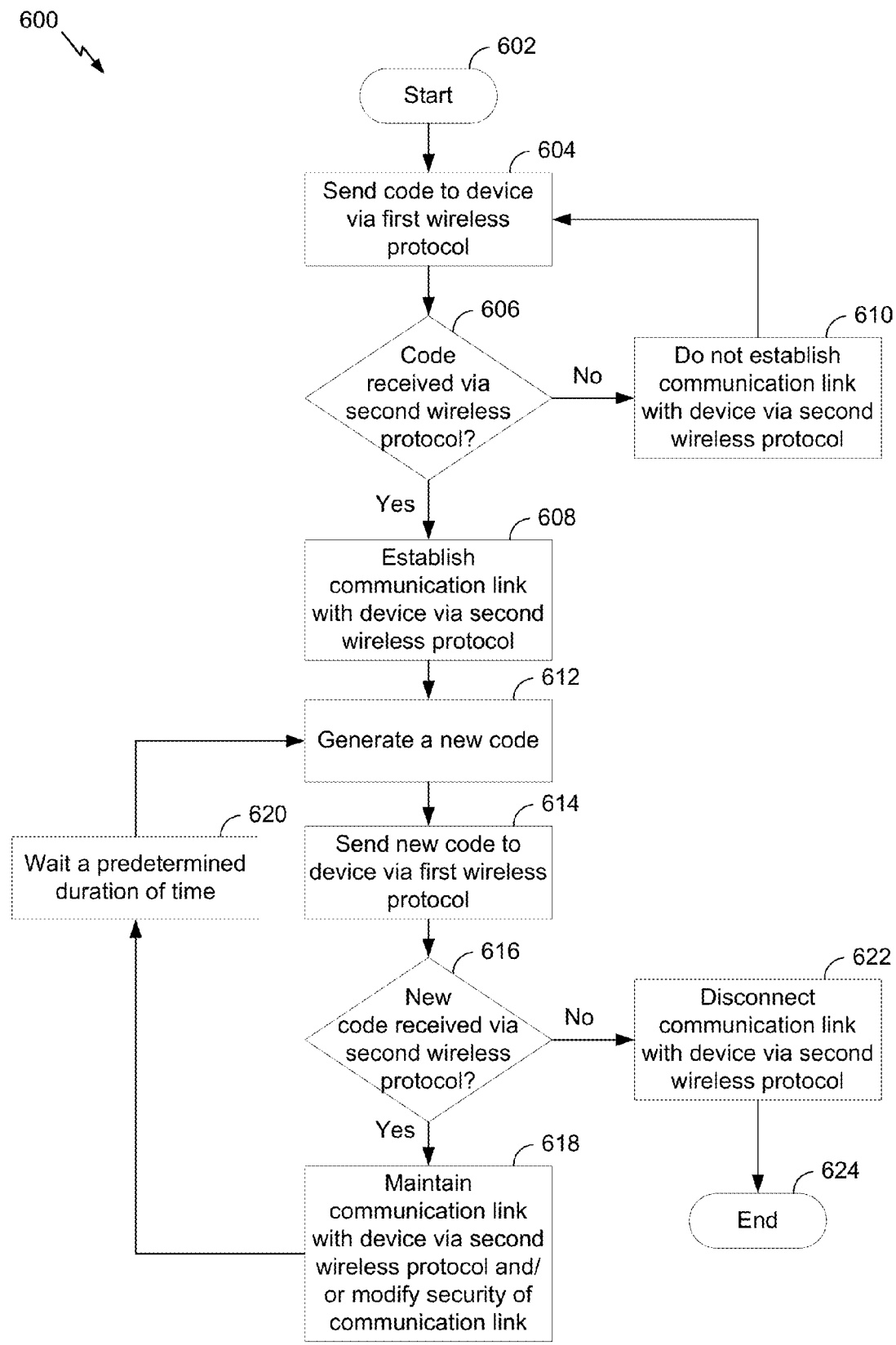
FIG. 6 illustrates another decision diagram for maintaining a secure connection between a station and an access point.

FIG. 6 illustrates another decision diagram 600 for maintaining a secure connection between a STA and an AP. In an embodiment, the decision diagram 600 may be executed by a processor, such as the processor 204, of a short-range base station and/or a long-range base station (e.g., the APs 304A, 404A, and/or 404B). As illustrated in FIG. 6, the process for maintaining a secure connection starts at block 602.

At block 604, a code is sent to a device, such as the STA 306 or 406, via a first wireless protocol. In an embodiment, the first wireless protocol is a short-range communication protocol. At block 606, the short-range and/or long-range base station determines whether the code is received via a second wireless protocol. In an embodiment, the second wireless protocol is a long-range communication protocol. If the code is received, the diagram 600 proceeds to block 608. If the code is not received, the diagram 600 proceeds to block 610.

At block 608, a communication link is established between the device and the long-range base station via the second wireless protocol. At block 610, a communication link is not established between the device and the long-range base station via the second wireless protocol. After block 610, the diagram 600 proceeds back to block 604.

At block 612, a new code is generated. At block 614, the new code is sent to the device via the first wireless protocol. At block 616, the short-range and/or long range base station determines whether the new code is received via the second wireless protocol. If the new code is received, the diagram 600 proceeds to block 618. If the new code is not received, the diagram 600 proceeds to block 622.

At block 618, the communication link via the second wireless protocol between the device and the long-range base station is maintained and/or the security (or encryption) of the communication link via the second wireless protocol is modified based on the new code. In an embodiment, modifying the security (or encryption) of the communication link via the second wireless protocol each time a new code is received enhances the security of the connection between the device and the long-range base station. At block 620, the short-range base station waits a predetermined period of time. In an embodiment, the short-range base station periodically generates new codes. The period of time may correspond to the duration of time that elapses between the generation of codes by the short-range base station. After block 620, the diagram 600 proceeds back to block 612.

At block 622, the communication link via the second wireless protocol between the device and the long-range base station is disconnected. In an embodiment, the short-range base station and/or the long-range base station may disconnect the communication link. After block 622, the diagram 600 proceeds to block 624 and ends.

Figure 7:
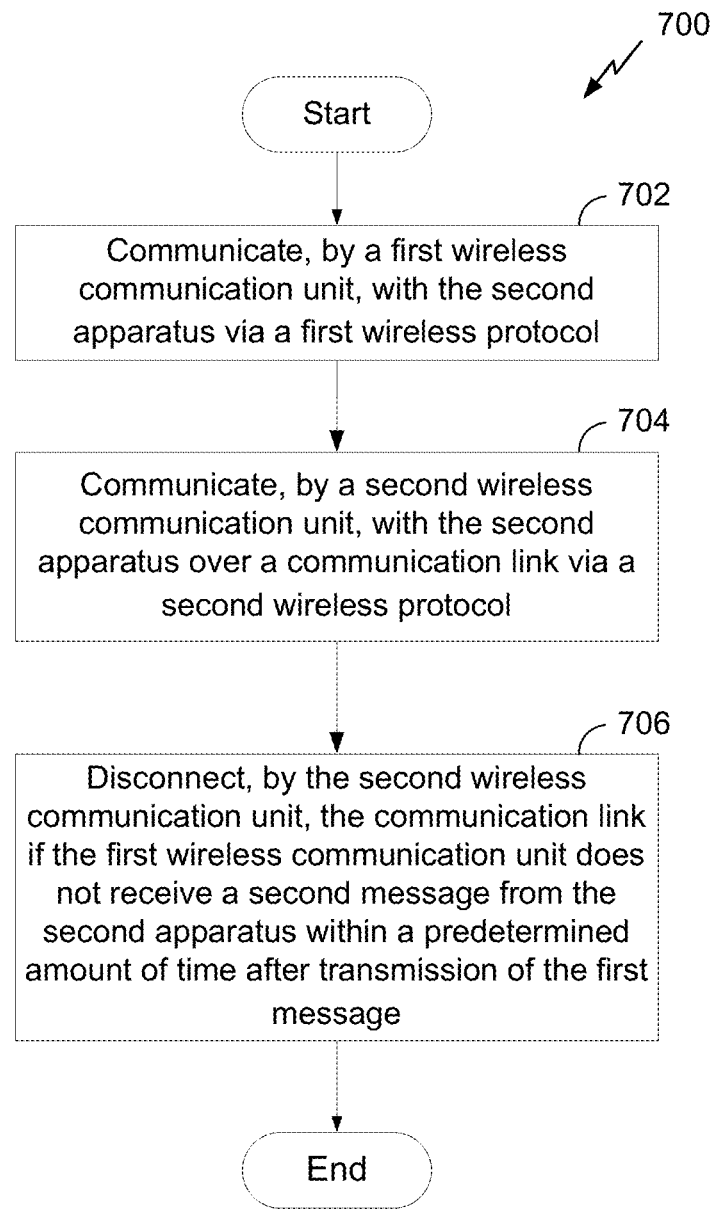
FIG. 7 is a flowchart of a process for communicating with a station in the wireless communication systems of FIGS. 1, 3, and/or 4.

FIG. 7 is a flowchart of a process 700 for communicating with a STA in the wireless communication systems of FIGS. 1, 3, and/or 4. At block 702, a first wireless communication unit communicates with a second apparatus via a first wireless protocol. In an embodiment, the first wireless communication unit is a short-range base station. In a further embodiment, the second apparatus is a STA. In a further embodiment, the first wireless protocol is a short-range communication protocol. In a further embodiment, a first message is transmitted via the first wireless protocol.

At block 704, a second wireless communication unit communicates with the second apparatus over a communication link via a second wireless protocol. In an embodiment, the second wireless communication unit is a long-range base station. In a further embodiment, the second wireless protocol is a long-range communication protocol.

At block 706, the communication link is disconnected by the second wireless communication unit if the first wireless communication unit does not receive a second message from the second apparatus within a predetermined amount of time after transmission of the first message. After block 706, the process 700 ends.

Figure 8:
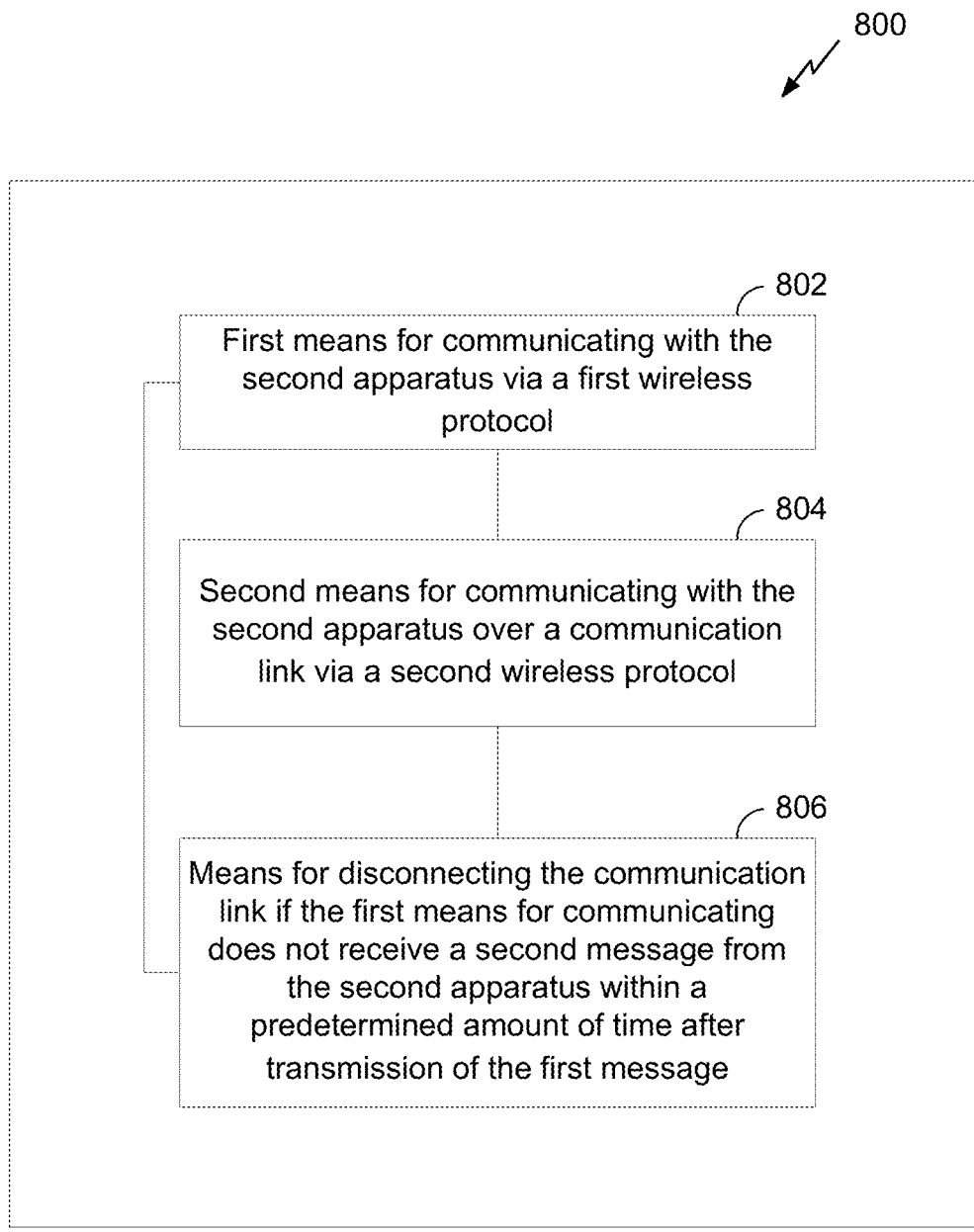
FIG. 8 is a functional block diagram of an exemplary device that may be employed within the wireless communication systems FIGS. 1, 3, and/or 4.

FIG. 8 is a functional block diagram of an exemplary device 800 that may be employed within the wireless communication systems 100, 300, and/or 400. The device 800 includes first means 802 for communicating with the second apparatus via a first wireless protocol. In an embodiment, first means 802 for communicating with the second apparatus via a first wireless protocol may be configured to perform one or more of the functions discussed above with respect to block 702. The device 800 further includes second means 804 for communicating with the second apparatus over a communication link via a second wireless protocol. In an embodiment, second means 804 for communicating with the second apparatus over a communication link via a second wireless protocol may be configured to perform one or more of the functions discussed above with respect to block 704. The device 800 further includes means 806 for disconnecting the communication link if the first means for communicating does not receive a second message from the second apparatus within a predetermined amount of time after transmission of the first message. In an embodiment, means 806 for disconnecting the communication link if the first means for communicating does not receive a second message from the second apparatus within a predetermined amount of time after transmission of the first message may be configured to perform one or more of the functions discussed above with respect to block 706.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A system comprising one or more apparatuses that communicate with a second apparatus, comprising:
a first wireless communication unit configured to communicate with the second apparatus via a first wireless protocol; and
a second wireless communication unit configured to establish a communication link with the second apparatus via a second wireless protocol, and to communicate with the second apparatus over the communication link via the second wireless protocol, wherein the first wireless communication unit is configured to transmit a first message to the second apparatus via the first wireless protocol after the communication link of the second wireless protocol is established, wherein the first message includes data for the second apparatus to modify a security parameter of the communication link, wherein the second wireless communication unit is configured to disconnect the communication link if the second apparatus does not modify the security parameter of the communication link according to the data included in the first message, and wherein the second wireless communication unit is further configured to disconnect the communication link if the first wireless communication unit does not receive a second message from the second apparatus within a predetermined amount of time after transmission of the first message.

2. The system of claim 1, wherein the first wireless protocol comprises one of a near field communication (NFC) standard or radio-frequency identification (RFID), and wherein the second wireless protocol comprises one of an IEEE 802.11 protocol or a wireless wide area network (WWAN) protocol.

3. The system of claim 1, wherein the second message comprises an acknowledgement that the first message was received by the second apparatus.

4. The system of claim 1, wherein the first wireless protocol is used to authenticate the second apparatus for the purpose of establishing the communication link.

5. The system of claim 4, wherein the first wireless communication unit transmits a first code to the second apparatus, wherein the first code is an encryption key, and wherein the communication link is established if the second wireless communication unit receives the first code via the second wireless protocol.

6. The system of claim 5, wherein the first wireless communication unit transmits a second code to the second apparatus after the communication link of the second wireless protocol is established, wherein the second code is a second encryption key configured to one of maintain or modify the communication link, and wherein the communication link is disconnected if the second wireless communication unit does not receive the second code via the second wireless protocol.

7. The system of claim 5, wherein the first wireless communication unit is further configured to periodically generate a new code after the communication link of the second wireless protocol is established, wherein the first wireless communication unit transmits each respective new code when the respective new code is generated, wherein the new code is a new encryption key configured to one of maintain or modify the communication link, and wherein the communication link is disconnected if the second wireless communication unit does not receive the respective new code.

8. The system of claim 1, wherein the first wireless communication unit is further configured to periodically transmit messages to the second apparatus via the first wireless protocol after the communication link of the second wireless protocol is established, and wherein the second wireless communication unit is further configured to disconnect the communication link if the first wireless communication unit does not receive a confirmation message from the second apparatus in response to any one of the messages transmitted to the second apparatus.

9. The system of claim 1, wherein the second apparatus is configured to periodically transmit messages to the second wireless communication unit after the communication link of the second wireless protocol is established, and wherein the second wireless communication unit is further configured to disconnect the communication link if the second wireless communication unit does not receive any one of the messages.

10. The system of claim 1, wherein the first wireless communication unit transmits the first message to the second apparatus when the second apparatus is located at a first position, wherein the second wireless communication unit receives the second message if the second apparatus is located at the first position, and wherein the second wireless communication unit does not receive the second message if the second apparatus is located at a second position different from the first position.

11. The system of claim 1, wherein a first apparatus in the one or more apparatuses comprises the first wireless communication unit and the second wireless communication unit.

12. The system of claim 1, wherein a first apparatus in the one or more apparatuses comprises the first wireless communication unit and a third apparatus in the one or more apparatuses comprises the second wireless communication unit.

13. The system of claim 1, wherein the first wireless communication unit is further configured to periodically transmit new messages to the second apparatus via the first wireless protocol after the communication link of the second wireless protocol is established, wherein each new message includes new data for the second apparatus to modify the security parameter of the communication link upon receipt of each new message, wherein the second wireless communication unit is further configured to disconnect the communication link if the second apparatus does not modify the security parameter of the communication link according to any of the new data included in the new messages.

14. A method of communicating with a second apparatus, comprising:
   communicating, by a first wireless communication unit, with the second apparatus via a first wireless protocol;
   establishing a communication link with the second apparatus via a second wireless protocol;
   communicating, by a second wireless communication unit, with the second apparatus over the communication link via the second wireless protocol;
   transmitting a first message from the first wireless communication unit to the second apparatus after the communication link of the second wireless protocol is established, wherein the first message includes data for the second apparatus to modify a security parameter of the communication link;
   disconnecting, by the second wireless communication unit, the communication link if the second apparatus does not modify the security parameter of the communication link according to the data included in the first message; and
   disconnecting, by the second wireless communication unit, the communication link if the first wireless communication unit does not receive a second message from the second apparatus within a predetermined amount of time after transmission of the first message.

15. The method of claim 14, wherein the first wireless protocol comprises one of a near field communication (NFC) standard or radio-frequency identification (RFID), and wherein the second wireless protocol comprises one of an IEEE 802.11 protocol or a wireless wide area network (WWAN) protocol.

16. The method of claim 14, wherein the second message comprises an acknowledgement that the first message was received by the second apparatus.

17. The method of claim 14, wherein the first wireless protocol is used to authenticate the second apparatus for the purpose of establishing the communication link.

18. The method of claim 17, wherein establishing the communication link comprises transmitting, by the first wireless communication unit, a first code to the second apparatus, wherein the first code is an encryption key, wherein the communication link is established if the second wireless communication unit receives the first code via the second wireless protocol.

19. The method of claim 18, further comprising transmitting, by the first wireless communication unit, a second code to the second apparatus after the communication link of the second wireless protocol is established, wherein the second code is a second encryption key configured to one of maintain or modify the communication link, wherein the communication link is disconnected if the second wireless communication unit does not receive the second code via the second wireless protocol.

20. The method of claim 18, further comprising:
periodically generating a new code after the communication link of the second wireless protocol is established, wherein the new code is a new encryption key configured to one of maintain or modify the communication link; and
transmitting each respective new code when the respective new code is generated, wherein the communication link is disconnected if the second wireless communication unit does not receive the respective new code.

21. The method of claim 14, further comprising:
periodically transmitting, by the first wireless communication unit, messages to the second apparatus via the first wireless protocol after the communication link of the second wireless protocol is established; and
disconnecting, by the second wireless communication unit, the communication link if the first wireless communication unit does not receive a confirmation message from the second apparatus in response to any one of the messages transmitted to the second apparatus.

22. The method of claim 14, wherein the second apparatus is configured to periodically transmit messages to the second wireless communication unit after the communication link of the second wireless protocol is established, and further comprising disconnecting, by the second wireless communication unit, the communication link if the second wireless communication unit does not receive any one of the messages.

23. The method of claim 14, wherein the first wireless communication unit transmits the first message to the second apparatus when the second apparatus is located at a first position, wherein the second wireless communication unit receives the second message if the second apparatus is located at the first position, and wherein the second wireless communication unit does not receive the second message if the second apparatus is located at a second position different from the first position.

24. The method of claim 14, wherein a first apparatus comprises the first wireless communication unit and the second wireless communication unit.

25. The method of claim 14, wherein a first apparatus comprises the first wireless communication unit and a third apparatus comprises the second wireless communication unit.

26. An apparatus for communicating with a second apparatus, comprising:
first means for communicating with the second apparatus via a first wireless protocol;
means for establishing a communication link with the second apparatus via a second wireless protocol;
second means for communicating with the second apparatus over the communication link via the second wireless protocol, wherein the first means for communicating includes means for transmitting a first message from the first means for communicating to the second apparatus after the communication link of the second wireless protocol is established, wherein the first message includes data for the second apparatus to modify a security parameter of the communication link;
means for disconnecting the communication link if the second apparatus does not modify the security parameter of the communication link according to the data included in the first message; and
means for disconnecting the communication link if the first means for communicating does not receive a second message from the second apparatus within a predetermined amount of time after transmission of the first message.

27. The apparatus of claim 26, wherein the first wireless protocol comprises one of a near field communication (NFC) standard or radio-frequency identification (RFID), and wherein the second wireless protocol comprises one of an IEEE 802.11 protocol or a wireless wide area network (WWAN) protocol.

28. The apparatus of claim 26, wherein the second message comprises an acknowledgement that the first message was received by the second apparatus.

29. The apparatus of claim 26, wherein the first wireless protocol is used to authenticate the second apparatus for the purpose of establishing the communication link.

30. The apparatus of claim 29, wherein the means for establishing the communication link comprises means for transmitting a first code to the second apparatus, wherein the first code is an encryption key, wherein the communication link is established if the second means for communicating receives the first code via the second wireless protocol.

31. The apparatus of claim 30, further comprising means for transmitting a second code to the second apparatus after the communication link of the second wireless protocol is established, wherein the second code is a second encryption key configured to one of maintain or modify the communication link, wherein the communication link is disconnected if the second means for communicating does not receive the second code via the second wireless protocol.

32. The apparatus of claim 30, further comprising:
means for periodically generating a new code after the communication link of the second wireless protocol is established, wherein the new code is a new encryption key configured to one of maintain or modify the communication link; and
means for transmitting the respective new code when the respective new code is generated, wherein the communication link is disconnected if the second means for communicating does not receive the respective new code.

33. The apparatus of claim 26, further comprising:
means for periodically transmitting messages to the second apparatus via the first wireless protocol after the communication link of the second wireless protocol is established; and
means for disconnecting the communication link if the first means for communicating does not receive a confirmation message from the second apparatus in response to any one of the messages transmitted to the second apparatus.

34. The apparatus of claim 26, wherein the second apparatus is configured to periodically transmit messages to the second means for communicating after the communication link of the second wireless protocol is established, and further comprising means for disconnecting the communication link if the second means for communicating does not receive any one of the messages.

35. The apparatus of claim 26, wherein the first means for communicating transmits the first message to the second apparatus when the second apparatus is located at a first position, wherein the second means for communicating receives the second message if the second apparatus is located at the first position, and wherein the second means for communicating does not receive the second message if the second apparatus is located at a second position different from the first position.

36. The apparatus of claim 26, wherein the first means for communicating comprises a first wireless communication unit, and wherein the second means for communicating and the means for disconnecting comprise a second wireless communication unit.

37. A non-transitory computer-readable medium comprising code that, when executed, causes a first apparatus to:
communicate, using a first wireless communication unit, with a second apparatus via a first wireless protocol;
establish a communication link with the second apparatus via a second wireless protocol;
communicate, using a second wireless communication unit, with the second apparatus over the communication link via the second wireless protocol;
transmit a first message from the first wireless communication unit to the second apparatus after the communication link of the second wireless protocol is established, wherein the first message includes data for the second apparatus to modify a security parameter of the communication link;
disconnect, using the second wireless communication unit, the communication link if the second apparatus does not modify the security parameter of the communication link according to the data included in the first message; and
disconnect, using the second wireless communication unit, the communication link if the first wireless communication unit does not receive a second message from the second apparatus within a predetermined amount of time after transmission of the first message.

38. The non-transitory computer-readable medium of claim 37, wherein the first wireless protocol comprises one of a near field communication (NFC) standard or radio-frequency identification (RFID), and wherein the second wireless protocol comprises one of an IEEE 802.11 protocol or a wireless wide area network (WWAN) protocol.

39. The non-transitory computer-readable medium of claim 37, wherein the second message comprises an acknowledgement that the first message was received by the second apparatus.

40. The non-transitory computer-readable medium of claim 37, wherein the first wireless protocol is used to authenticate the second apparatus for the purpose of establishing the communication link.

41. The non-transitory computer-readable medium of claim 40, further comprising code that, when executed, causes the first apparatus to transmit, using the first wireless communication unit, a first code to the second apparatus, wherein the first code is an encryption key, wherein the communication link is established if the second wireless communication unit receives the first code via the second wireless protocol.

42. The non-transitory computer-readable medium of claim 41, further comprising code that, when executed, causes the first apparatus to transmit, using the first wireless communication unit, a second code to the second apparatus after the communication link of the second wireless protocol is established, wherein the second code is a second encryption key configured to one of maintain or modify the communication link, wherein the communication link is disconnected if the second wireless communication unit does not receive the second code via the second wireless protocol.

43. The non-transitory computer-readable medium of claim 41, further comprising code that, when executed, causes the first apparatus to:
periodically generate a new code after the communication link of the second wireless protocol is established, wherein the new code is a new encryption key configured to one of maintain or modify the communication link; and
transmit the respective new code when the respective new code is generated, wherein the communication link is disconnected if the second wireless communication unit does not receive the respective new code.

44. The non-transitory computer-readable medium of claim 37, further comprising code that, when executed, causes the first apparatus to:
periodically transmit, using the first wireless communication unit, messages to the second apparatus via the first wireless protocol after the communication link of the second wireless protocol is established; and
disconnect, using the second wireless communication unit, the communication link if the first wireless communication unit does not receive a confirmation message from the second apparatus in response to any one of the messages transmitted to the second apparatus.

45. The non-transitory computer-readable medium of claim 37, wherein the second apparatus is configured to periodically transmit messages to the second wireless communication unit after the communication link of the second wireless protocol is established, and further comprising code that, when executed, causes the first apparatus to disconnect, using the second wireless communication unit, the communication link if the second wireless communication unit does not receive any one of the messages.

46. The non-transitory computer-readable medium of claim 37, wherein the first wireless communication unit transmits the first message to the second apparatus when the second apparatus is located at a first position, wherein the second wireless communication unit receives the second message if the second apparatus is located at the first position, and wherein the second wireless communication unit does not receive the second message if the second apparatus is located at a second position different from the first position.

* * * * *